United States Patent
Liu et al.

(10) Patent No.: US 12,273,301 B1
(45) Date of Patent: Apr. 8, 2025

(54) METHOD AND ACCESS POINT FOR CONTROLLING BANDWIDTH

(71) Applicant: TP-LINK CORPORATION PTE. LTD., Singapore (SG)

(72) Inventors: Wengang Liu, Shenzhen (CN); Shengbo Zhang, Shenzhen (CN)

(73) Assignee: TP-LINK CORPORATION PTE. LTD., Singapore (SG)

( * ) Notice: Subject to any disclaimer, the term of this patent is extended or adjusted under 35 U.S.C. 154(b) by 0 days.

(21) Appl. No.: 18/656,252

(22) Filed: May 6, 2024

(51) Int. Cl.
*H04W 4/00* (2018.01)
*H04L 5/00* (2006.01)
*H04W 72/541* (2023.01)
*H04W 84/12* (2009.01)

(52) U.S. Cl.
CPC .......... *H04L 5/0094* (2013.01); *H04L 5/0085* (2013.01); *H04W 72/541* (2023.01); *H04W 84/12* (2013.01)

(58) Field of Classification Search
CPC .. H04L 5/0094; H04L 5/0085; H04W 72/541; H04W 84/12
See application file for complete search history.

(56) References Cited

U.S. PATENT DOCUMENTS

| | | | |
|---|---|---|---|
| 2008/0056180 A1* | 3/2008 | Li | H04W 36/06 370/329 |
| 2009/0046647 A1* | 2/2009 | Roh | H04L 5/001 370/329 |
| 2013/0208587 A1* | 8/2013 | Bala | H04W 72/0446 370/278 |
| 2016/0219450 A1* | 7/2016 | Wakabayashi | H04L 5/0053 |
| 2020/0029232 A1* | 1/2020 | Wakabayashi | H04L 1/0026 |

FOREIGN PATENT DOCUMENTS

| | | |
|---|---|---|
| CN | 113541859 A | 10/2021 |
| CN | 115550961 A | 12/2022 |
| WO | 2022020610 | 1/2022 |

* cited by examiner

*Primary Examiner* — Thai Dinh Hoang
(74) *Attorney, Agent, or Firm* — Loeb & Loeb LLP

(57) ABSTRACT

The present disclosure provides a method and an AP for controlling bandwidth. A method for controlling bandwidth of a channel including a plurality of subchannels by an access point, including: acquiring first wireless status indication for the channel without scanning the plurality of subchannels of the channel; determining whether the channel is abnormal based on the first wireless status indication for the channel; scanning the plurality of subchannels to acquire second wireless status indication for each of the plurality of subchannels if the channel is determined to be abnormal; determining one or more subchannels in the plurality of subchannels to be abnormal based on the second wireless status indication for each of the plurality of subchannels; and puncturing the one or more subchannels determined to be abnormal.

18 Claims, 4 Drawing Sheets

METHOD AND ACCESS POINT FOR CONTROLLING BANDWIDTH

TECHNICAL FIELD

The present disclosure relates to wireless communication, and more specifically, to a method for controlling bandwidth and an access point (AP) performing the method.

BACKGROUND

In a wireless network such as a Wireless Local Area Network (WLAN), an AP communicates with one or more client devices, also referred to as stations (STA), that are Wi-Fi compatible. A channel over which the AP communicates with one or more client devices may be divided into a plurality of subchannels. Puncturing is a wireless communication technique introduced in IEEE 802.11ax to control the bandwidth of the channel that the AP uses to communicate with one or more client devices. Puncturing allows the AP to transmit and receive wireless packets over a portion of the channel excluding punctured subchannels. Accordingly, the puncturing enables the AP to maximize the available bandwidth of the channel and thereby improve its throughput.

The AP generally performs puncturing according to the Clear Channel Assessment (CCA) mechanism. The AP scans the subchannels of the channel to acquire the CCA measurements for each subchannel. A subchannel whose CCA measurement is greater than a predetermined threshold for the CCA measurement is then punctured by the AP. However, the process of scanning the subchannels of the channel may have negative impacts on one or more client devices being served by the AP, such as performance degradation due to increased delay or decreased data transmission/reception speed, and even disconnection from the AP.

There is a need for an improved mechanism for controlling the bandwidth of the channel that the AP uses to communicate with one or more client devices while minimizing the negative impacts on one or more client devices being served by the AP.

SUMMARY

In view of the above problems, the present disclosure provides a method for controlling the bandwidth of the channel that an AP uses to communicate with one or more client devices and an AP performing the method.

According to an aspect of the present disclosure, there is provided a method for controlling bandwidth of a channel including a plurality of subchannels by an access point, the method comprising: acquiring first wireless status indication for the channel without scanning the plurality of subchannels of the channel; determining whether the channel is abnormal based on the first wireless status indication for the channel; scanning the plurality of subchannels to acquire second wireless status indication for each of the plurality of subchannels if the channel is determined to be abnormal; determining one or more subchannels in the plurality of subchannels to be abnormal based on the second wireless status indication for each of the plurality of subchannels; and puncturing the one or more subchannels determined to be abnormal.

In some embodiments, the method may further comprise: determining whether one or more subchannels in the plurality of subchannels are punctured if the channel is determined not to be abnormal; scanning the punctured one or more subchannels to acquire third wireless status indication for each of the punctured one or more subchannels if one or more subchannels are determined to be punctured; and depuncturing the punctured subchannel that is determined to be normal based on third wireless status indication therefor.

In some embodiments, the first wireless status indication for the channel may comprise one or more wireless status parameters for the channel, and the one or more wireless status parameters may comprise a channel usage ratio and/or a packet delivery ratio for the channel.

In some embodiments, the second wireless status indication for each of the plurality of subchannels may comprise two or more wireless status parameters, and the two or more wireless status parameters may comprise clear channel assessment (CCA) and one or more other wireless status parameters for the subchannel.

In some embodiments, the one or more other wireless status parameters for the subchannel may comprise noise and/or a channel usage ratio for the subchannel.

In some embodiments, the third wireless status indication for each of the punctured one or more subchannels may comprise one or more wireless status parameters, and the one or more wireless status parameters may comprise clear channel assessment (CCA), noise and/or a channel usage ratio for the subchannel.

In some embodiments, the determining whether the channel is abnormal may be based on whether none of the one or more wireless status parameters meets predetermined threshold thereof.

In some embodiments, the determining whether the channel is abnormal may be based on whether not all the one or more wireless status parameters meet respective predetermined thresholds thereof.

In some embodiments, determining one or more subchannels in the plurality of subchannels to be abnormal based on the second wireless status indication for each of the plurality of subchannels may comprise: for each of the plurality of subchannels, determining the subchannel to be abnormal if not all of the two or more wireless status parameters for the subchannel meet predetermined threshold thereof.

In some embodiments, the punctured subchannel may be determined to be normal if all the one or more wireless status parameters for the punctured subchannel meet respective predetermined thresholds thereof.

According to another aspect of the present disclosure, there is provided an AP for controlling bandwidth of a channel including a plurality of subchannels, the AP comprising: one or more processors; a memory coupled to at least one of the processors; and a set of computer program instructions stored in the memory, which, when executed by at least one of the processors, perform actions of: acquiring first wireless status indication for the channel without scanning the plurality of subchannels of the channel; determining whether the channel is abnormal based on the first wireless status indication for the channel; scanning the plurality of subchannels to acquire second wireless status indication for each of the plurality of subchannels if the channel is determined to be abnormal; determining one or more subchannels in the plurality of subchannels to be abnormal based on the second wireless status indication for each of the plurality of subchannels; and puncturing the one or more subchannels determined to be abnormal.

According to yet another aspect of the present disclosure, there is provided a computer program product for controlling bandwidth of a channel including a plurality of subchannels, the computer program product comprising a non-transitory computer readable storage medium having program instructions embodied therewith, the program instructions executable by a processor of the AP to cause the processor to: acquire first wireless status indication for the channel without scanning the plurality of subchannels of the channel; determine whether the channel is abnormal based on the first wireless status indication for the channel; scan the plurality of subchannels to acquire second wireless status indication for each of the plurality of subchannels if the channel is determined to be abnormal; determine one or more subchannels in the plurality of subchannels to be abnormal based on the second wireless status indication for each of the plurality of subchannels; and puncture the one or more subchannels determined to be abnormal.

At least based on the above embodiments of the present disclosure, an improved mechanism for controlling the bandwidth of the channel that the AP uses to communicate with one or more clients may be realized while minimizing the negative impacts on the client devices being served by the AP.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements. In the accompanying drawings.

DETAILED DESCRIPTION

Figure 1:
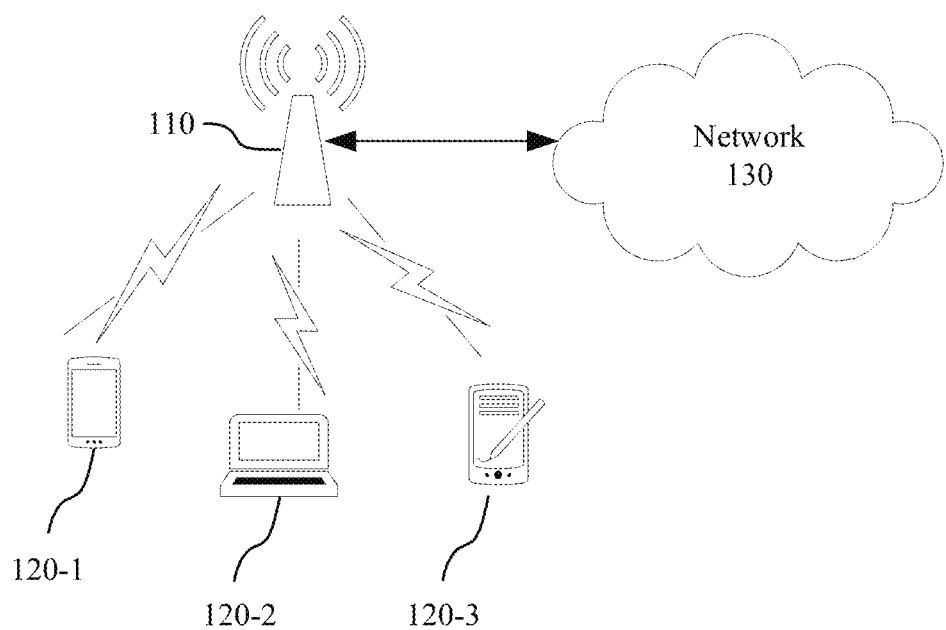
FIG. 1 is a schematic diagram illustrating an exemplary application scenario according to an embodiment of the present disclosure.

The technical solution of the present disclosure will be clearly and completely described below in conjunction with accompanying drawings. The described embodiments are part of embodiments of the present disclosure, but not all of them. Based on the embodiments in the present disclosure, all other embodiments acquired by ordinary skilled in the art without making any creative efforts fall within the scope of protection of the present disclosure.

Some of the drawings may not depict all the components of a given method, device and system. Like reference numerals may be used to denote like features throughout the specification and drawings.

FIG. 1 is a schematic diagram illustrating an exemplary application scenario according to an embodiment of the present disclosure.

Referring to FIG. 1, AP 110 may communicate wirelessly with the client devices (also referred to as STAs) 120-1 through 120-3 over a wireless channel and using one or more Wi-Fi protocols. The client devices 120-1, 120-2 and 120-3 have wireless connections with AP 110. The client devices 120-1, 120-2 and 120-3 may be mobile phones, wearable communication devices, laptop computers, desktop computers, tablet computers, personal Digital Assistant (PDA), or the like. AP 110 may access network 103 via a wired channel such as a fiber. The network 103 may include various networks, such as wide area work (WAN), local area network (LAN), metropolitan area network, peer-to-peer, and the like. AP 110 thereby provides network access to the client devices 120-1, 120-2 and 120-3.

Figure 2:
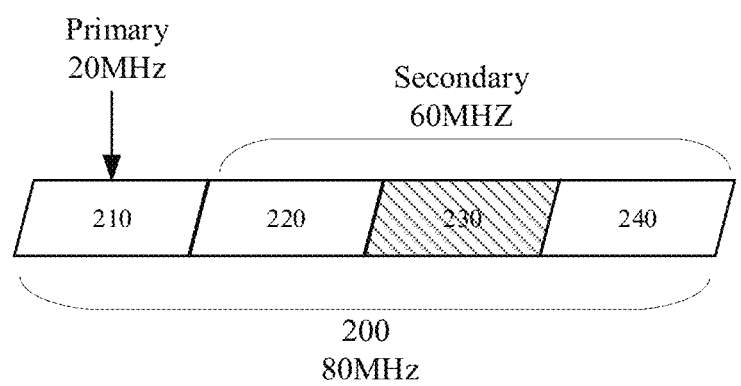
FIG. 2 shows an exemplary channel that includes four subchannels according to an embodiment of the present disclosure.

FIG. 2 shows an exemplary wireless channel 200 that includes four subchannels according to an embodiment of the present disclosure. Channel 200 may be used by AP 110 to communicate with the client devices 120-1, 120-2 and 120-3, as shown in FIG. 1.

Referring to FIG. 2, channel 200 is shown as including the first to fourth subchannels 210 to 240. The bandwidth of each subchannel (i.e., the difference between the maximum frequency and the minimum frequency of the subchannel) is 20 MHz, but not limited hereto. In some implementations, the first subchannel 210 is the primary subchannel and the second to fourth subchannels 220 to 240 are secondary subchannels.

If AP 110 detects interference on the third subchannel 230, AP 110 may puncture the third subchannel 230 such that AP 110 may avoid communicating over the third subchannel 230 while still utilizing the remaining first, second and fourth subchannels 210, 220 and 240 in channel 200. The available bandwidth for AP 110 is 60 MHz.

According to the CCA mechanism, AP 110 may scan the first to fourth subchannels 210 to 240 in channel 200 one by one to acquire the CCA measurements for the first to fourth subchannels 210 to 240. AP 110 may determine the subchannel is occupied if the CCA measurement for the subchannel is greater than a predetermined threshold of CCA for the subchannel. However, the operation of the scanning may have negative impacts on the client devices 120 (i.e., the client devices 120-1, 120-2 and 120-3) being served by AP 110, such as increased delay, decreased data transmission/reception speed, and even disconnection from AP 110.

Figure 3:
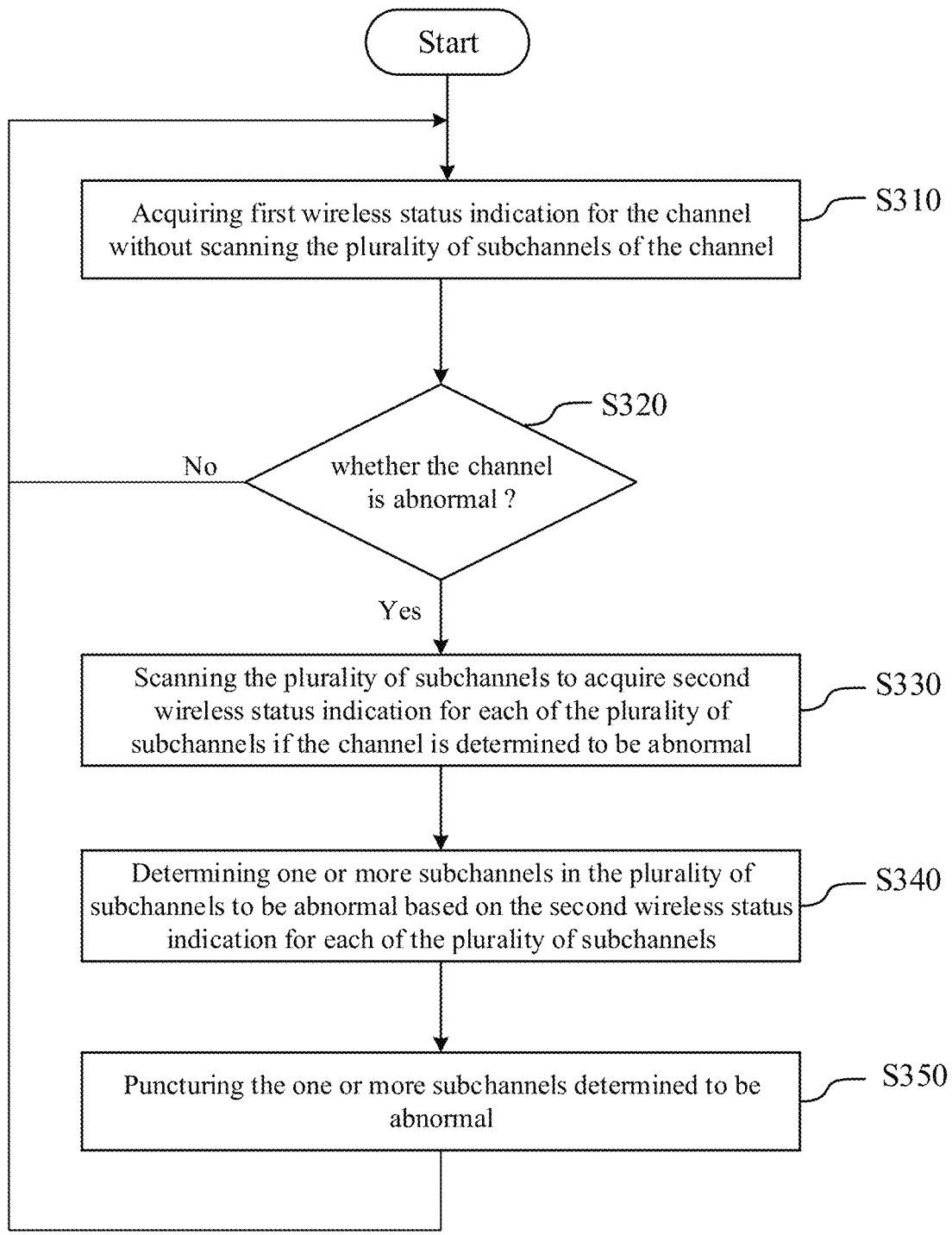
FIG. 3 is a schematic flowchart illustrating the method for controlling bandwidth of a channel including a plurality of subchannels by an AP according to one embodiment of the present disclosure.

FIG. 3 is a schematic flowchart illustrating method 300 for controlling bandwidth of a channel including a plurality of subchannels by an AP according to one embodiment of the present disclosure. Method 300 may be implemented by AP 110 in FIG. 1. Referring to FIG. 3, method 300 may include steps S310~S350.

At step S310, first wireless status indication for channel 200 may be acquired without scanning the plurality of subchannels 210 to 240 of channel 200. The first wireless status indication for channel 200 may include one or more wireless status parameters for channel 200, which indicate the condition or performance of channel 200 and may be acquired by AP 110 without scanning the first to fourth subchannels 210 to 240.

In some implementations, the one or more wireless status parameters of the first wireless status indication may include the channel usage ratio and/or the packet delivery ratio for channel 200.

The channel usage ratio for channel 200 indicates the ratio of a time period, during which AP 110 may transmit or receive packets over channel 200, in a predetermined time window with respect to the predetermined time window. The time period during which AP 110 may transmit or receive packets over channel 200 may decrease due to the interference on channel 200. For example, if the predetermined time window is 5 milliseconds (ms) and the time period during which AP 110 may transmit or receive packets over channel 200 is 3 ms, the channel usage ratio for channel 200 is 60%.

The packet delivery ratio for channel 200 is the ratio of the number of packets successfully transmitted over channel 200 in a predetermined time window to the total number of packets sent over channel 200 in the predetermined time window. For example, if the number of packets successfully transmitted over channel 200 is 800 in the predetermined time window and the total number of packets sent over channel 200 is 1000 in the same time window, the packet delivery ratio for channel 200 is 80%.

AP 110 may acquire the channel usage ratio and/or the packet delivery ratio for channel 200 based on the information recorded when transmitting or receiving packets. For example, AP 110 may record the time periods with packet transmission, and/or record the number of successfully transmitted packets based on the responses from the client devices 120.

At step S320, whether the channel is abnormal is determined based on the first wireless status indication for the channel acquired at step S310.

In some implementations, whether channel 200 is abnormal is determined based on whether none of the one or more wireless status parameters in the first wireless status indication meets the predetermined threshold thereof.

For example, the first wireless status indication may comprise the channel usage ratio and the packet delivery ratio for channel 200. The predetermined threshold of the channel usage ratio for channel 200 may be 80%, that is, the channel usage ratio for channel 200 equal to or greater than 80% is desired. The predetermined threshold of the packet delivery ratio for the channel 200 may be 90%, that is, the packet delivery ratio for channel 200 equal to or greater than 90% is desired. AP 110 may determine channel 200 to be abnormal if the channel usage ratio for channel 200 is low than 80% (does not meet the predetermined threshold for the channel usage ratio) and the packet delivery ratio for channel 200 is lower than 90% (does not meet the predetermined threshold for the packet delivery ratio), in other words, none of the channel usage ratio and the packet delivery ratio meets their respective predetermined thresholds. On the other hand, if either of the channel usage ratio and the packet delivery ratio meets its predetermined threshold, the channel will be determined as normal.

Alternatively, in some other implementations, whether channel 200 is abnormal may be determined based on whether not all the one or more wireless status parameters meet respective predetermined thresholds thereof.

For example, the first wireless status indication may comprise the channel usage ratio and the packet delivery ratio for channel 200. The predetermined threshold of the channel usage ratio for channel 200 is 80%, and the predetermined threshold of the packet delivery ratio for channel 200 is 90%. AP 110 may determine channel 200 to be abnormal if the channel usage ratio for channel 200 is lower than 80% (does not meet the predetermined threshold for the channel usage ratio) or if the packet delivery ratio for channel 200 is lower than 90% (does not meet the predetermined threshold for the packet delivery ratio) or if the channel usage ratio for channel 200 is lower than 80% and the packet delivery ratio for channel 200 is lower than 90%.

On the other hand, if both the channel usage ratio and the packet delivery ratio meet their respective predetermined thresholds, the channel will be determined as normal.

In some implementations, the first wireless status indication may comprise one wireless status parameter such as the channel usage ratio or the packet delivery ratio for channel 200. Under such a circumstance, whether channel 200 is abnormal may be determined based on whether the wireless status parameter meets its predetermined threshold.

Please note that a parameter meeting a threshold for the parameter herein may mean that the channel quality reflected by the parameter is equal to or better than the channel quality reflected by the threshold. Therefore, depending on the context, meeting a threshold may refer to being greater than or equal to the threshold, or being less than or equal to the threshold. The threshold may be predetermined based on the quality requirements of the channel according to experiments or experience.

Method 300 returns to step S310 if the channel is determined to be normal at step S320 or proceeds to step S330 if the channel is determined to be abnormal at step S320.

At step S330, the plurality of subchannels 210 to 240 may be scanned to acquire second wireless status indication for each of subchannels 210 to 240 if channel 200 is determined to be abnormal. The second wireless status indication for each subchannel channel may include two or more wireless status parameters for each subchannel channel. The two or more wireless status parameters for the subchannel may include clear channel assessment (CCA) and one or more other wireless status parameters for the subchannel. The one or more other wireless status parameters for the subchannel may be any parameter that may indicate the condition or performance of the subchannel. In some implementations, the one or more other wireless status parameters for the subchannel may comprise the noise for the subchannel and/or a channel usage ratio for the subchannel.

The noise for each subchannel 210, 220, 230 or 240 may include noises caused by Wi-Fi interference and/or non-Wi-Fi interference. Wi-Fi interference relates to the presence of unwanted signals or disruptions within the spectrum and may lead to issues such as reduced data throughput and increased packet loss. Non-Wi-Fi interference relates to sources outside the spectrum, such as interference coming from the hardware, environmental conditions, and thermal noise of electronic components.

The channel usage ratio for each subchannel 210, 220, 230 or 240 indicates the ratio of a time period, during which AP 110 may transmit or receive packets over the subchannel, in a predetermined time window with respect to the predetermined time window. For example, the channel usage ratio for subchannel 230 is 10% if the predetermined time window is 5 ms and the time period during which AP 110 may transmit or receive packets over subchannel 230 is 0.5 ms.

At step S340, one or more subchannels in the plurality of to be abnormal may be determined to be abnormal based on the second wireless status indication for each of the plurality of subchannels. At step S350, the one or more subchannels determined to be abnormal in step S340 may be punctured.

For example, for each subchannel 210, 220, 230 or 240, AP 110 may determine a subchannel to be abnormal if not all of the two or more wireless status parameters in the second wireless status indication for the subchannel meet the predetermined threshold thereof, that is, at least one of the two or more wireless status parameters for the subchannel does not meet predetermined threshold thereof.

For example, the second wireless status indication for a subchannel may include CCA, the noise and the channel usage ratio for the subchannel. The predetermined threshold of the CCA for each subchannel may be −82 dBm, that is, the CCA measurement for each subchannel equal to or less than −82 dBm is desired. The predetermined threshold of the noise for each subchannel may be −62 dBm is desired, the noise for each subchannel equal to or less than−62 dBm is desired. The predetermined threshold of the subchannel usage ratio for each subchannel may 80%, that is, the channel usage ratio for each subchannel equal to or greater than 80% is desired. AP 110 may determine a subchannel 210, 220, 230 or 240 to be abnormal if at least of the above three parameters does not meet its predetermined threshold. For example, AP 110 may determine subchannel 230 to be abnormal if the CCA measurement for subchannel 230 is larger than −82 dBm, or if the noise for subchannel 230 is larger than −62 dm, or if the subchannel usage ratio for subchannel 230 is lower than 80%. Accordingly, AP 110 punctures subchannel 230 at step S350.

In some implementations, method 300 may return to step S310 after the puncturing at step S350. In some implementations, method 300 may transmit a message including, but not limited to, channel switch announcement (CSA) and/or operation mode indication (OMI) to the client devices being served by AP 110 to inform the change of the bandwidth of channel 200 after the puncturing such that the client devices may keep connected with AP 110.

An advantage of method 300 is to reduce performance degradation of client devices while dynamically control and adjust the bandwidth of the channel. In method 300, AP 110 determines whether channel 200 is abnormal based on first wireless status indication first and then scans each subchannel 210, 220, 230 and 240 only if channel 200 is determined as abnormal. Therefore, method 300 is advantageous for reducing the times of scanning subchannels during bandwidth control. As a result, method 300 may reduce performance degradation of the served client devices such as increased delay, decreased data transmission/reception speed, and even disconnection from the AP 110.

Another advantage of some embodiments of method 300 is to identify more kinds of interferences on the subchannel than the CCA mechanism. In the conventional solution, AP uses only CCA measurements for a subchannel to determine whether the subchannel needs to be punctured. However, CCA measurements may fail to identify the following situations: the situation in which a non-Wi-Fi interference existing in a certain subchannel 210, 220, 230 or 240 causes the performance of channel 200 to decrease but does not reach the predetermined CCA threshold for the subchannel, the situation in which the Wi-Fi signals in the subchannel are relatively congested and causes the performance of the channel 200 to decrease but does not reach the predetermined CCA threshold for the subchannel, and the situation in which some abnormalities (such as hidden nodes) in a certain subchannel 210, 220, 230 or 240 cause packet delivery failures on channel 200 and affect the performance of the channel 200 but may not be reflected by the CCA measurement for the subchannel. Unlike the conventional solution, embodiments of method 300 may determine whether to puncture a subchannel based not only on the CCA measurement for the subchannel but also on one or more other wireless status parameters for the subchannel, such as the noise for the subchannel and/or the channel usage ratio for the subchannel. Compared with the conventional solution, method 300 may identify more kinds of interferences on the subchannel that may cause the subchannel to be punctured. As a result, method 300 may avoid channel performance degradations caused by subchannel abnormalities that the CCA mechanism may not identify.

Figure 4:
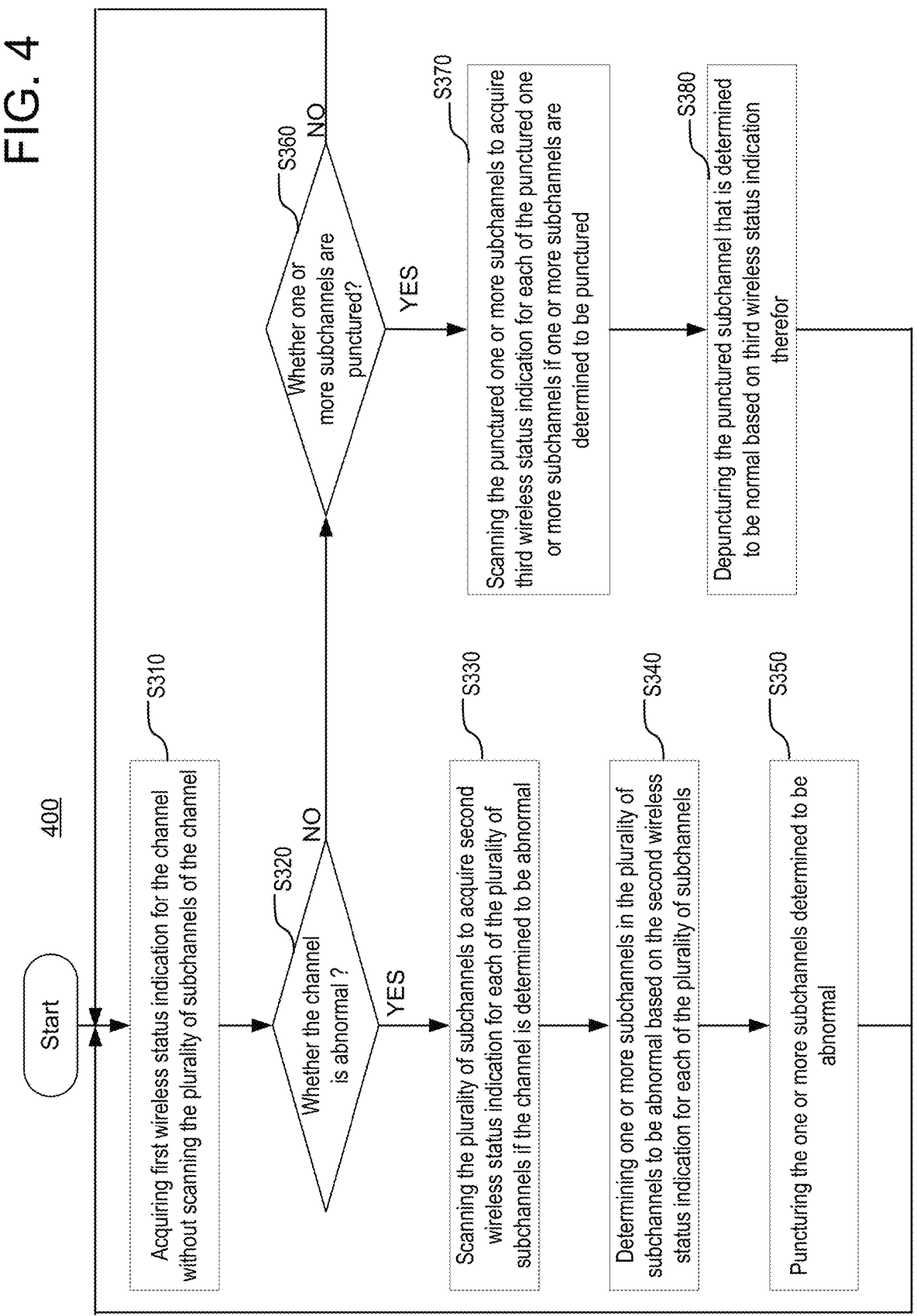
FIG. 4 is a schematic flowchart illustrating the method for controlling bandwidth of a channel including a plurality of subchannels by an AP according to another embodiment of the present disclosure.

FIG. 4 is a schematic flowchart illustrating the method for controlling bandwidth according to another embodiment of the present disclosure.

Referring to FIG. 4, method 400 may include steps S310~S380. The steps S310 to S350 in method 400 are the same as those in method 300 and details are omitted herein for conciseness.

Method 400 may proceed to step S360 if channel 200 is determined to not be abnormal at step S320. At step S360, whether one or more subchannels in the plurality of subchannels 210, 220, 230 and 240 are punctured is determined. AP may record the information on which subchannel is punctured when puncturing the subchannel.

Method 400 returns to step S310 if no subchannel in the plurality of subchannels is determined as being punctured at step S360 or proceeds to step S370 if one or more subchannels are determined as being punctured at step S360.

At step S370, the punctured one or more subchannels may be scanned to acquire third wireless status indication for each of the punctured one or more subchannels.

For example, if AP 110 detects that subchannels 230 and 240 are punctured at step S360, AP 110 scans subchannels 230 and 240 to acquire third wireless status indication for each of the punctured subchannels 230 and 240.

The third wireless status indication may include one or more wireless status parameters. The one or more wireless status parameters in the third wireless status indication may be the same as or different from those in the second wireless status indication. For example, AP 110 may determine the punctured subchannel to be normal if all the one or more wireless status parameters in the third wireless status indication for the punctured subchannel meet respective predetermined thresholds thereof.

For example, the third wireless status indication for a subchannel may include CCA, the noise and the channel usage ratio for the subchannel, and the predetermined thresholds of the CCA, the noise and the channel usage ratio are −82 dBm, −62 dBm and 80%, respectively. At step S370, AP 110 may acquire the CCA measurement, the noise and the channel usage ratio for subchannel 230 are −90 dBm, −70 dBm and 85% respectively, and the CCA measurement, the noise and the channel usage ratio for subchannel 240 are −90 dBm, −50 dBm and 75% respectively, by scanning the punctured subchannels 230 and 240. Then, AP 110 determines subchannel 230 to be normal since all the CCA measurement, the noise and the channel usage ratio for subchannel 230 meet respective predetermined thresholds. To the contrary, AP 110 determines subchannel 240 to be abnormal since the noise and the channel usage ratio of subchannel 240 do not meet the respective predetermined thresholds. Therefore, at step S380, AP 110 depunctures (i.e., inverse operations of puncturing) the punctured subchannel 230 while maintaining the punctured subchannel 240 punctured.

According to method 400, AP 110 scans only the one or more punctured subchannels to determine whether to depuncture the one or more punctured subchannels, which is advantageous for avoiding negative impacts caused by scanning all the subchannels.

Figure 5:
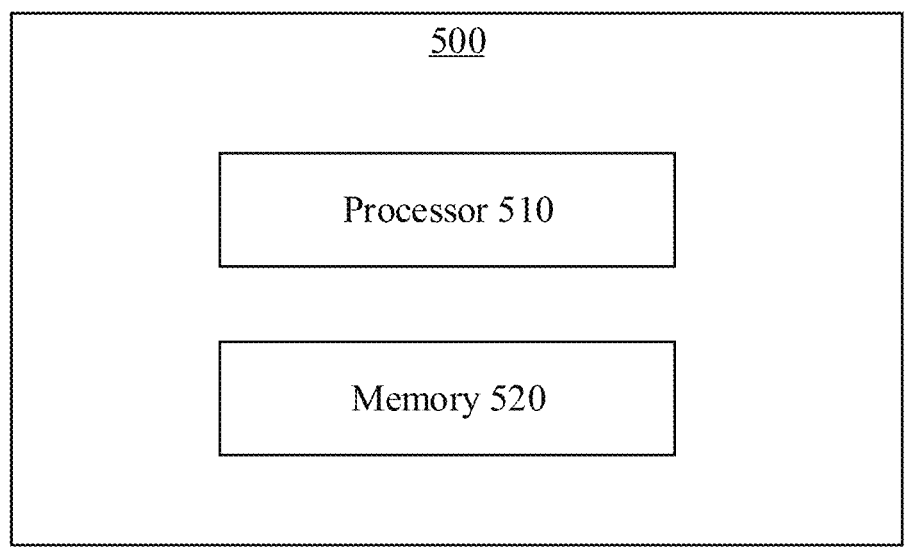
FIG. 5 is a schematic block diagram of an AP according to one embodiment of the present disclosure.

FIG. 5 is a schematic block diagram of an AP 500 according to one embodiment of the present disclosure. It should be noted that AP 500 depicted in FIG. 5 may correspond to AP 110 as described above and may be used to perform the operations of controlling bandwidth as described in the above with respect to method 300 and method 400.

As shown in FIG. 5, AP 500 may comprise processor 501 and memory 502. Processor 501 is communicatively coupled with the memory and configured to perform steps in method 300 or method 400 discussed above.

Examples of processor 501 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

Processor 501 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 502.

Memory 502 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. Memory 502 may reside in processor 501, external to processor 501, or distributed across multiple entities including processor 501. Memory 502 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

In addition, according to another embodiment of the present disclosure, a computer program product for controlling the bandwidth of a channel including a plurality of subchannels is disclosed. As an example, the computer program product comprises a non-transitory computer readable storage medium having program instructions embodied therewith, and the program instructions are executable by a processor. When executed, the program instructions cause the processor to perform one or more of the procedures above described, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

An expression such as "according to", "based on", "depend on", and so on as used in the disclosure does not mean "according only to", "based only on", or "dependent only on", unless it is explicitly otherwise stated. In other words, such expression generally means "according at least to", "based at least on", or "depend at least on" in the disclosure.

Any reference in the disclosure to an element using the designation "first", "second" and so forth is not intended to comprehensively limit the number or order of such elements. These expressions may be used in the disclosure as a convenient method for distinguishing two or more units. Thus, a reference to a first unit and a second unit does not imply that only two units may be employed or that the first unit must precede the second unit in some form.

The term "determining" used in the disclosure may include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth may also be regarded as "determining". That is, regarding "determining", several actions may be regarded as "determining".

The terms such as "connected", "coupled" or any of their variants used in the disclosure refer to any connection or combination, direct or indirect, between two or more units, which may include the following situations: between two units that are "connected" or "coupled" with each other, there are one or more intermediate units. The coupling or connection between the units may be physical or logical or may also be a combination of the two. As used in the disclosure, two units may be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

It should be noted that the above description is only some embodiments of the present disclosure and an illustration of the applied technical principles. It should be understood by those skilled in the art that the present disclosure scope involved in the present disclosure is not limited to the technical solutions resulting from specific combinations of the above technical features, but also encompasses other technical solutions resulting from any combination of the above technical features or their equivalents without departing from the above disclosed concept, for example, the technical solutions formed by replacing between the above features and the technical features with similar functions disclosed in the present disclosure (but not limited hereto).

The present disclosure has been described in detail above, but it is obvious to those skilled in the art that the present disclosure is not limited to the embodiments described in the disclosure. The present disclosure may be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for controlling bandwidth of a channel including a plurality of subchannels by an access point, comprising:
   acquiring first wireless status indication for the channel without scanning the plurality of subchannels of the channel;
   determining whether the channel is abnormal based on the first wireless status indication for the channel;
   scanning the plurality of subchannels to acquire second wireless status indication for each of the plurality of subchannels if the channel is determined to be abnormal;
   determining one or more subchannels in the plurality of subchannels to be abnormal based on the second wireless status indication for each of the plurality of subchannels; and
   puncturing the one or more subchannels determined to be abnormal;
   determining whether one or more subchannels in the plurality of subchannels are punctured if the channel is determined not to be abnormal;
   scanning the punctured one or more subchannels to acquire third wireless status indication for each of the punctured one or more subchannels if one or more subchannels are determined to be punctured; and
   depuncturing the punctured subchannel that is determined to be normal based on third wireless status indication therefor.

2. The method of claim 1, wherein the first wireless status indication for the channel comprises one or more wireless status parameters for the channel, and the one or more wireless status parameters comprise a channel usage ratio and/or a packet delivery ratio for the channel.

3. The method of claim 2, wherein the determining whether the channel is abnormal is based on whether none of the one or more wireless status parameters meets predetermined threshold thereof.

4. The method of claim 2, wherein the determining whether the channel is abnormal is based on whether not all the one or more wireless status parameters meet respective predetermined thresholds thereof.

5. The method of claim 1, wherein the second wireless status indication for each of the plurality of subchannels comprises two or more wireless status parameters, and the two or more wireless status parameters comprise clear channel assessment (CCA) and one or more other wireless status parameters for the subchannel.

6. The method of claim 5, the one or more other wireless status parameters for the subchannel comprise noise and/or a channel usage ratio for the subchannel.

7. The method of claim 5, wherein determining one or more subchannels in the plurality of subchannels to be abnormal based on the second wireless status indication for each of the plurality of subchannels comprises:
   for each of the plurality of subchannels, determining the subchannel to be abnormal if not all of the two or more wireless status parameters for the subchannel meet predetermined threshold thereof.

8. The method of claim 1, wherein the third wireless status indication for each of the punctured one or more subchannels comprises one or more wireless status parameters, and the one or more wireless status parameters comprise clear channel assessment (CCA), noise and/or a channel usage ratio for the subchannel.

9. The method of claim 8, wherein the punctured subchannel is determined to be normal if all the one or more wireless status parameters for the punctured subchannel meet respective predetermined thresholds thereof.

10. An access point (AP) for controlling bandwidth of a channel including a plurality of subchannels, comprising:
    one or more processors;
    a memory coupled to at least one of the processors; and
    a set of computer program instructions stored in the memory, which, when executed by at least one of the processors, perform actions of:
    acquiring first wireless status indication for the channel without scanning the plurality of subchannels of the channel;
    determining whether the channel is abnormal based on the first wireless status indication for the channel;
    scanning the plurality of subchannels to acquire second wireless status indication for each of the plurality of subchannels if the channel is determined to be abnormal;
    determining one or more subchannels in the plurality of subchannels to be abnormal based on the second wireless status indication for each of the plurality of subchannels; and
    puncturing the one or more subchannels determined to be abnormal;
    determining whether one or more subchannels in the plurality of subchannels are punctured if the channel is determined not to be abnormal;
    scanning the punctured one or more subchannels to acquire third wireless status indication for each of the punctured one or more subchannels if one or more subchannels are determined to be punctured; and
    depuncturing the punctured subchannel that is determined to be normal based on third wireless status indication therefor.

11. The AP of claim 10, wherein the first wireless status indication for the channel comprises one or more wireless status parameters for the channel, and the one or more wireless status parameters comprise a channel usage ratio and/or a packet delivery ratio for the channel.

12. The AP of claim 11, wherein the determining whether the channel is abnormal is based on whether none of the one or more wireless status parameters meets predetermined threshold thereof.

13. The AP of claim 11, wherein the determining whether the channel is abnormal is based on whether not all the one or more wireless status parameters meet respective predetermined thresholds thereof.

14. The AP of claim 10, wherein the second wireless status indication for each of the plurality of subchannels comprises two or more wireless status parameters, the two or more wireless status parameters comprise clear channel assessment (CCA) and one or more other wireless status parameters for the subchannel.

15. The AP of claim 14, the one or more other wireless status parameters for the subchannel comprise noise and a channel usage ratio for the subchannel.

16. The AP of claim 14, wherein determining one or more subchannels in the plurality of subchannels to be abnormal based on the second wireless status indication for each of the plurality of subchannels comprises:
    for each of the plurality of subchannels, determining the subchannel to be abnormal if not all of the two or more wireless status parameters for the subchannel meet predetermined threshold thereof.

17. The AP of claim 10, wherein the third wireless status indication for each of the punctured one or more subchannels comprises one or more wireless status parameters, and the one or more wireless status parameters comprise clear channel assessment (CCA), noise and/or a channel usage ratio for the subchannel.

18. The AP of claim 17, wherein the punctured subchannel is determined to be normal if all the one or more wireless status parameters for the punctured subchannel meet respective predetermined thresholds thereof.

* * * * *